United States Patent
Kim

[11] Patent Number: 5,943,226
[45] Date of Patent: Aug. 24, 1999

[54] BOOTSTRAP CHARGE PUMP CIRCUIT

[75] Inventor: Young-Hwan Kim, Choongcheongbuk-do, Rep. of Korea

[73] Assignee: LG Semicon Co., Ltd., Cheongju, Rep. of Korea

[21] Appl. No.: 09/021,316

[22] Filed: Feb. 10, 1998

[30] Foreign Application Priority Data

Feb. 27, 1997 [KR] Rep. of Korea .................. 97-6246

[51] Int. Cl.[6] ................................................ H02M 3/18
[52] U.S. Cl. ........................................ 363/60; 327/537
[58] Field of Search ........................... 363/60; 327/536, 327/537, 390, 589; 326/88, 97

[56] References Cited

U.S. PATENT DOCUMENTS

| | | | |
|---|---|---|---|
| 5,126,590 | 6/1992 | Chern | 327/536 |
| 5,381,051 | 1/1995 | Morton | 327/290 |
| 5,422,586 | 6/1995 | Tedrow et al. | 327/306 |

OTHER PUBLICATIONS

Whitters, Johan S., Groeseneken, Guido and Maes, Herman E., "Analysis and modeling of ON–Chip high–voltage generator circuits for use in EEPROM circuits," IEEE Journal of Solid–State Circuits, vol. 24, No. 5 (Oct. 1989). pp. 1372–1379.

*Primary Examiner*—Shawn Riley
*Attorney, Agent, or Firm*—Fleshner & Kim

[57] ABSTRACT

A charge pump circuit is provided that includes a clock signal generator for generating a first and second clock signals respectively having a Vdd (a precharge voltage) level, and a third and fourth clock signals having 2Vdd levels (twice the precharge voltage) and phases substantially identical to the first and second clock signals. A precharge voltage output unit outputs a Vdd level of precharge voltage. A precharge pumping unit alternately performs a pumping operation and a precharging operation using a first pumping stage and a second pumping stage that function symmetrically to each other with regard to a precharge voltage outputted from the precharge voltage output unit in accordance with the first to fourth clock signals. The charge pump circuit alternatively performs the pumping operation and the precharge operation to improve pumping efficiency. In addition, the charge pump circuit has a less complex composition.

26 Claims, 6 Drawing Sheets

FIG. 3
BACKGROUND ART
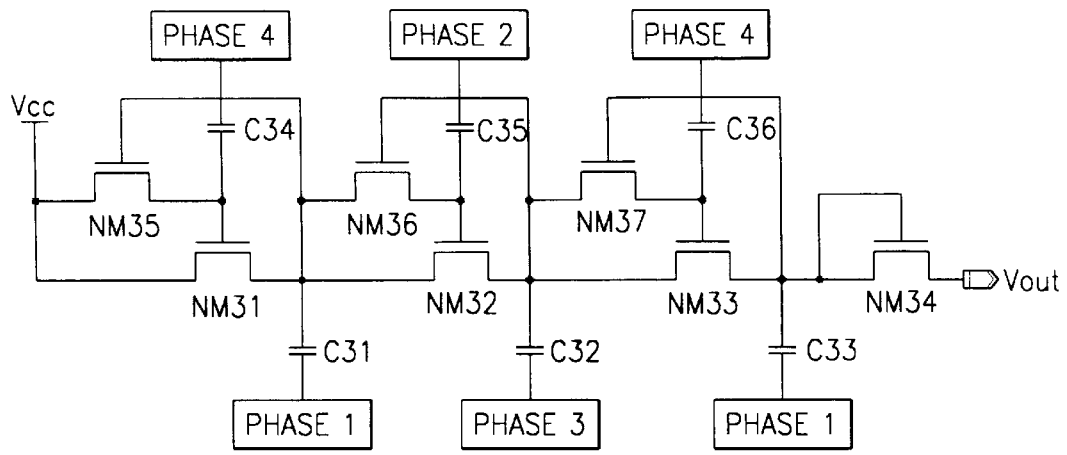
FIG. 4A
BACKGROUND ART PHASE 1
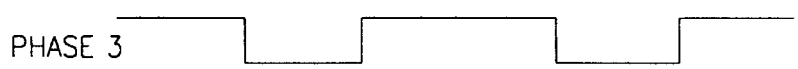
FIG. 4B
BACKGROUND ART PHASE 3
FIG. 4C
BACKGROUND ART PHASE 2
FIG. 4D
BACKGROUND ART PHASE 4

FIG. 6A CLKX 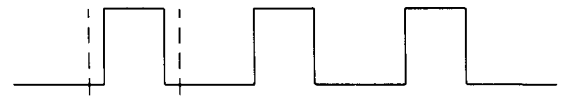
FIG. 6B CLKY 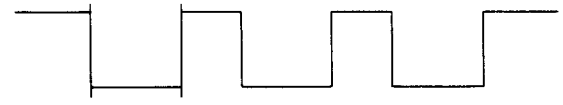
FIG. 6C 2CLKX 
FIG. 6D 2CLKY 
FIG. 7
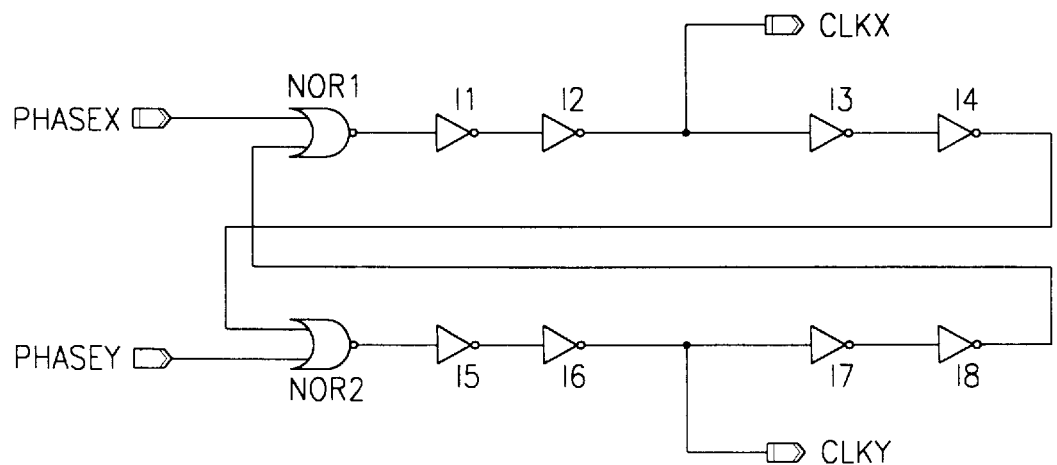

FIG. 8A phasex 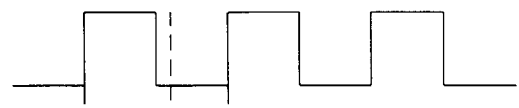

FIG. 8C CLKX 
FIG. 8D phasey 
FIG. 8E CLKY 
FIG. 9
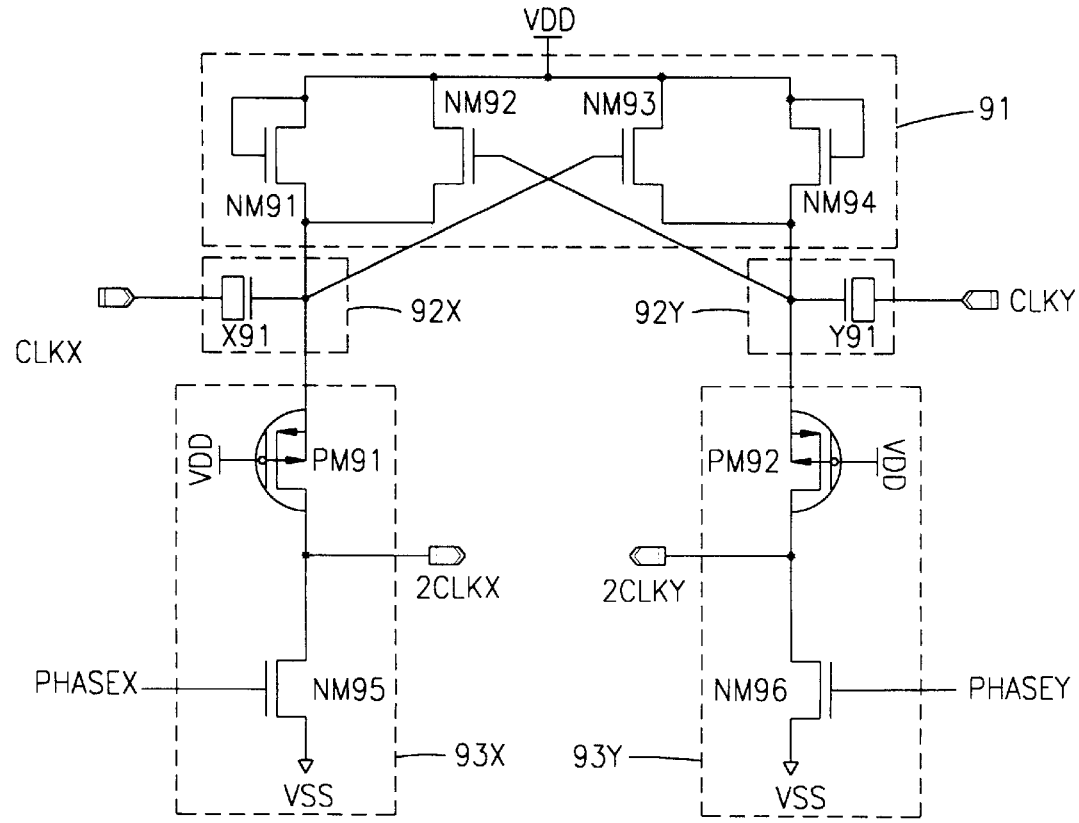

FIG. 10A PHASEX 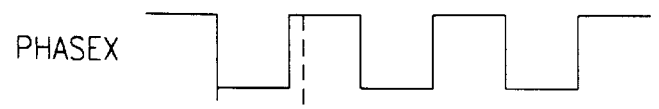
FIG. 10B PHASEY 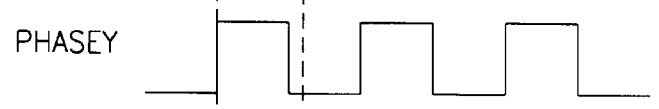
FIG. 10C CLKX 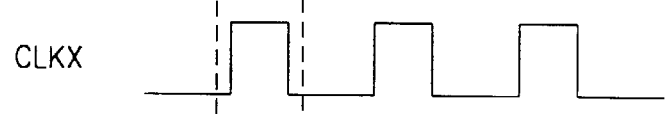
FIG. 10D CLKY 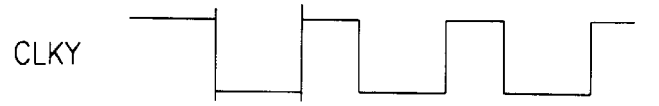
FIG. 10E 2CLKX 
FIG. 10F 2CLKY 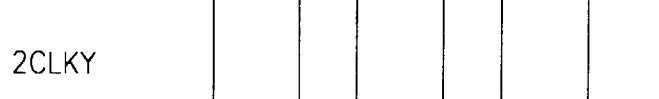

BOOTSTRAP CHARGE PUMP CIRCUIT

BACKGROUND OF THE INVENTION

1. Field of the Invention

The present invention relates to a charge pump circuit, and more particularly, to a bootstrap charge pump applicable to a fast motion frequency.

2. Background of the Related Art

As shown in FIG. 1, a related art charge pump circuit is disclosed in U.S. Pat. No. 5,422,586 (Jun. 6, 1995). The charge pump circuit includes NMOS transistors NM11–NM13 serially coupled between a supply voltage Vcc and an output voltage Vout. The drain and the gate of each of the NMOS transistors NM11–NM13 are coupled to each other. At this time, a clock signal CLK1 is applied via a condenser C11 to a source-drain node between the NMOS transistors NM11, NM12. Another clock signal CLK2 is applied by another condenser C12 to a source-drain node between the NMOS transistors NM12, NM13.

The operation of the related art charge pump circuit of FIG. 1 will now be described. When the supply voltage Vcc is supplied, the NMOS transistor NM11 is turned on. A voltage Vcc–Vth (i.e., Vth is a threshold voltage of an NMOS transistor) is charged in the condenser C11, and the NMOS transistor NM12 is turned off.

As shown in FIG. 2A, when a high level clock CLK1 is supplied, the voltage in the condenser C11 is pumped from a value of Vcc–Vth to a value of 2Vcc. The NMOS transistor NM11 is turned off, and the NMOS transistor NM12 is turned on in accordance with the pumped value of 2Vcc, respectively. Then, the value of 2Vcc is charged in the condenser C12.

As shown in FIG. 2B, when a high level clock CLK2 is supplied, the voltage in the condenser C12 is pumped from a value of 2Vcc to a value of 3Vcc. The NMOS transistor NM13 is turned on in accordance with the pumped value of 3Vcc, and the value of 3Vcc is outputted through the output terminal Vout.

Then, when the clock signal CLK1 is in a low level, the NMOS transistor NM12 is turned off, and the NMOS transistor NM11 is turned on. The charging operation of the condenser C12 is completed, and a charging operation of the condenser C11 starts again. The above-described steps are repeatedly carried out.

However, in the related art charge pump circuit, when the voltage pumped through the NMOS transistors NM11–NM13, there may occur a voltage drop as much as the threshold voltage in the NMOS transistors NM1–NM13. Therefore, assuming that the number of pumping groups is N, the final output voltage Vout is obtained by (N+1)×(Vcc–Vth). Accordingly, a pumping efficiency becomes extremely deteriorated during a low voltage operation.

Another related art example, FIG. 3 illustrates a charge pump circuit for reinforcing a pumping voltage drop by use of a threshold voltage. As shown in FIG. 3, the charge pump circuit includes NMOS transistors NM31–NM34 serially coupled between a supply voltage Vcc and an output voltage Vout. The NMOS transistors NM35–NM37 are sequentially provided between drains and gates of the NMOS transistors NM31–NM33.

At this time, a clock signal CLK4 (PHASE 4) is applied to each of the gates of the NMOS transistors NM31, NM33 via a corresponding one of condensers C34, C36, and a clock signal CLK2 (PHASE 2) is applied to the gate of the NMOS transistor NM32 via a condenser C35. The clock signal CLK1 (PHASE 1) is applied via each of the condensers C31, C33 to the drains of the NMOS transistors NM34, NM36 and to the gates of the NMOS transistors NM35, NM37. The clock signal CLK3 CHASE 3) is applied to the drain of the NMOS transistor NM33 and to the gate of the NMOS transistor NM36 via the condenser C32.

The operation of the related art charge pump circuit of FIG. 3 will now be described. When the supply voltage Vcc is supplied, and high level signals CLK3, CLK4 are inputted via a clock terminal as shown in FIGS. 4B and 4D, the NMOS transistors NM31, NM36 are turned on, to charge a Vcc level voltage in the condensers C31, C35. When a high level clock signal CLK1 as shown in FIG. 4A is inputted, the voltage in the condenser C31 is pumped to 2Vcc, and the pumped value of 2Vcc is charged in the condenser C35 via the NMOS transistor NM36 to turn on the NMOS transistor NM32. Consequently, the 2Vcc voltage pumped in the condenser C31 is charged in the condenser C32.

When the clock signal CLK3 is transmitted to a low level, the NMOS transistor NM36 is turned off, which maintains a charged state of the condenser C35. When the clock signal CLK2 is inputted in a high level as shown in FIG. 4C, the gate voltage of the NMOS transistor NM32 is precharged to about 3Vcc in accordance with the pumping operation of the condenser C35. As a result, the gate voltage 3Vcc of the NMOS transistor NM32 becomes higher than that of the drain voltage 2Vcc, so that the NMOS transistor NM32 is turned on without a voltage drop of Vth.

Therefore, the voltage value of 2Vcc is charged in the condenser C32 by use of the NMOS transistor NM32 of the 2Vcc voltage pumped by the condenser C31. Further, the condenser C36 is turned on and charged in a 2Vcc level through the turned-on NMOS transistor NM37. When the clock signal CLK2 is again transmitted in a low level, the gate voltage of the NMOS transistor NM32 is dropped to 2Vcc for thereby turning off the respective NMOS transistors NM32, NM36. That is, the NMOS transistors NM32, NM36 are turned off faster than the time in which the clock signal CLK1 is turned to a low state.

Also, when the clock signal CLK3 is turned to a high level, the voltage in the condenser C32 is pumped to a voltage value of 3Vcc, and the pumped voltage of 3Vcc is charged in the condenser C36 via the turned-on NMOS transistor NM37. At this time, when a high level clock signal CLK4 is supplied, the gate voltage of the NMOS transistor NM33 becomes precharged to about 4Vcc in accordance with the pumping operation of the condenser C36. As a result, the gate voltage 4Vcc of the NMOS transistor NM33 becomes higher than the drain voltage of 3Vcc to turn on the NMOS transistor NM33 within a range in which the voltage drop of Vth does not occur.

Therefore, when the voltage value of 3Vcc pumped by the condenser C32 is charged in the condenser C33 via the turned-on NMOS transistor NM33. The clock signal CLK4 is transmitted to a low level and the gate voltage of the NMOS transistor NM33 is dropped to 3Vcc to turn off the respective NMOS transistors NM33, NM37. When the clock signal CLK1 is transmitted to a high level, the voltage in the condenser C33 is pumped to 4Vcc and outputted through the turned-on NMOS transistor NM34.

As shown in FIG. 3, when the number N of the pumping groups is three (3), and the supply voltage Vcc is 4.4V, the final output voltage Vout for being outputted through a output terminal becomes 17.1V, whereby the pumping voltage is not dropped by the threshold voltage Vth of the respective NMOS transistors NM31–NM34. The above-described steps are repeatedly carried out for pumping operation of the related art charge pump circuit of FIG. 3.

However, although the related art charge pump circuit as shown in FIG. 3 confines the voltage drop caused by the threshold voltage of the NMOS transistors, the four kinds of clock signals complicate the operating steps. In particular, because the pumped voltage is transferred to a next pumping group only when the clock signals CLK2, CLK4 are in high level, it has been difficult to transfer the pumped voltage during operation in a fast motion frequency.

The above references are incorporated by reference herein where appropriate for appropriate teachings of additional or alternative details, features and/or technical background.

SUMMARY OF THE INVENTION

An object of the present invention is to provide a charge pump circuit that substantially obviates at least the disadvantages and problems in the related art.

Another object of the present invention to provide a charge pump circuit that improves a pumping efficiency.

A further object of the present invention to provide a bootstrap charge pump circuit that prevents a voltage drop caused by a threshold voltage to obtain a desired level of voltage.

To achieve at least the above-described objects in a whole or in parts, there is provided a bootstrap charge pump circuit according to the present invention that includes a clock signal generator for generating a first and second clock signals respectively having a Vdd (precharge voltage) level, and a third and fourth signals having 2Vdd levels and phases identical to the first and second clock signals, a precharge voltage output unit for outputting a Vdd level of precharge voltage, and a precharge pumping unit for alternately carrying out a pumping operation and a precharging operation with regard to a precharge voltage outputted from the precharge voltage output unit via symmetric first and second pumping stages in accordance with the first to fourth clock signals.

To further achieve at least the above-described objects in a whole or in parts, there is provided a charge pump unit according to the present invention including a plurality of charge pumping devices receiving first through fourth clock signals and an incoming voltage level, wherein each charge pumping devices includes a first pumping stage; and a second pumping stage, wherein the first and second pumping stages alternately perform a pumping operation and a precharging operation with regard to the incoming voltage based on the first to fourth clock signals, and wherein the last of the plurality of charge pumping devices outputs a desired voltage level each cycle.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a diagram of another related art charge pump circuit;

FIGS. 4A through 4D are diagrams showing timing waveforms of clock signals applied to the charge pump circuit in FIG. 3;

FIGS. 6A through 6D are diagrams showing timing waveforms of respective clock signals in FIG. 5;

FIG. 7 is a circuit diagram illustrating a preferred embodiment of a clock signal generator;

FIGS. 8A through 8E are diagrams showing timing waveforms of respective signals in FIG. 7;

FIG. 9 is a circuit diagram illustrating another preferred embodiment of a clock signal generator; and FIGS. 10A through 10F are diagrams showing timing waveforms of respective signals in FIG. 9.

DETAILED DESCRIPTION OF PREFERRED EMBODIMENTS

Figure 1:
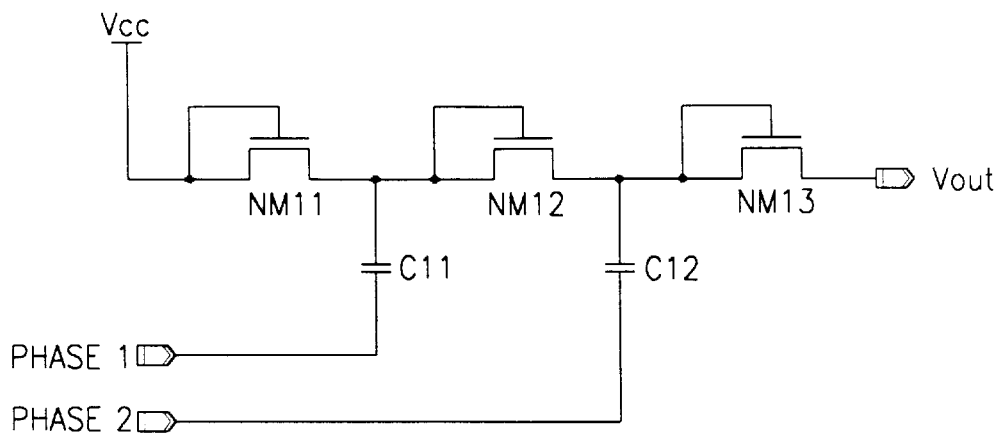
FIG. 1 is a diagram showing a related charge pump circuit.
Figure 2A:
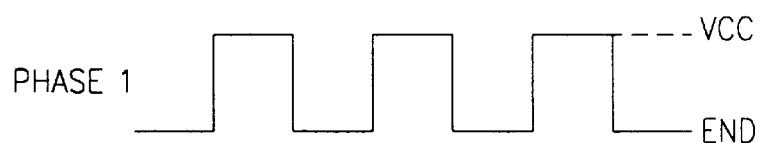
FIGS. 2A and 2B are diagrams showing timing waveforms of respective signals in FIG. 1.
Figure 2B:
Figure 5:
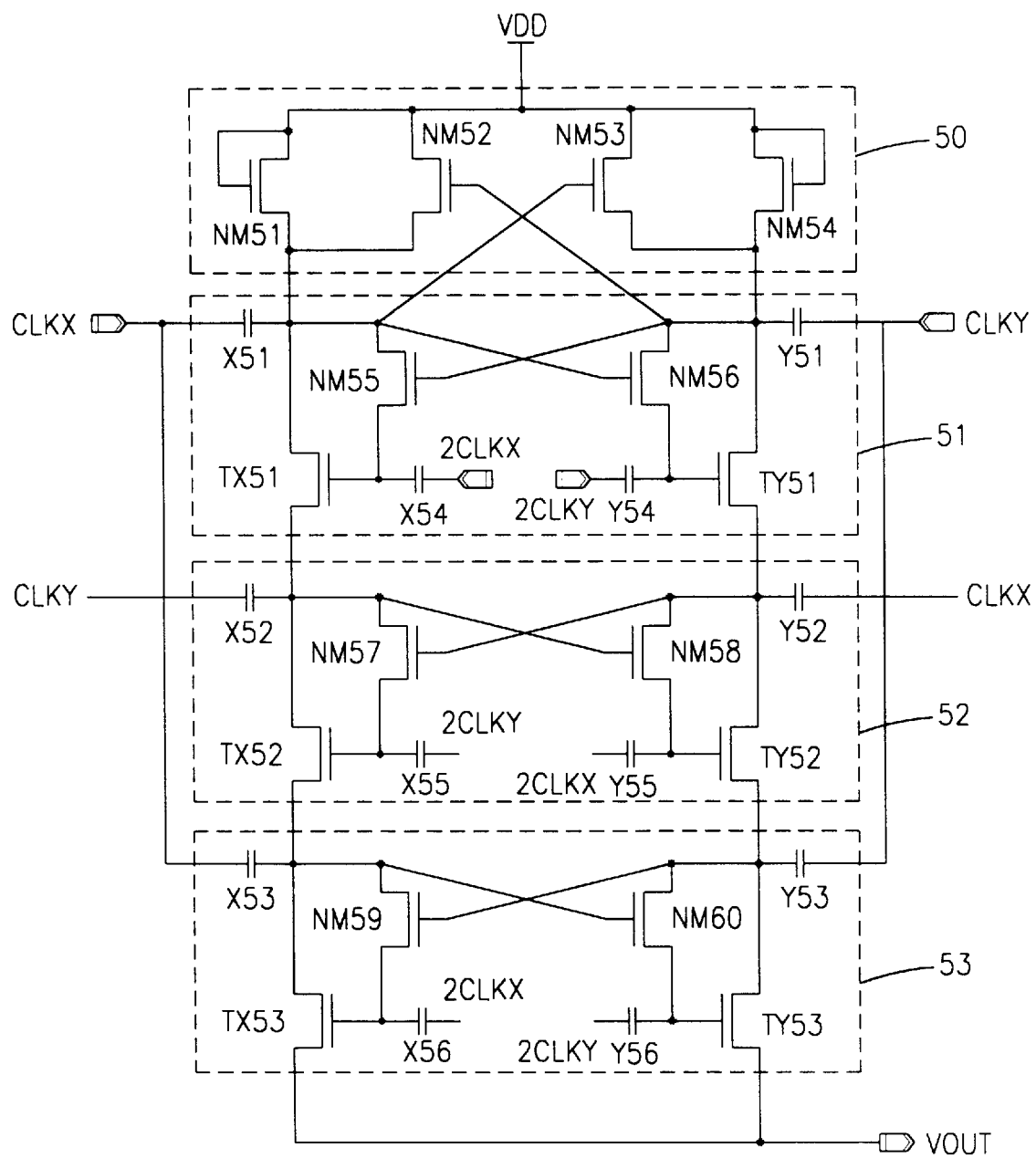
FIG. 5 is a circuit diagram showing a preferred embodiment of a bootstrap charge pump circuit according to the present invention.

As shown in FIG. 5, a preferred embodiment of a charge pump circuit according to the present invention includes a precharge voltage output unit 50 for outputting a precharge voltage Vdd in accordance with clock signals CLKX, CLKY and a first charge pumping unit 51 for alternately carrying out a pumping operation and a precharge operation through a first pumping stage and a second pumping stage in accordance with clock signals (CLKX, 2CLKX), (CLKY, 2CLKY). A second pumping unit 52 receives a pumped voltage 2Vdd from the first charge pumping unit 51 and alternately performs the pumping operation and the precharge operation through the first pumping operation and the second pumping operation. A third pumping unit 53 receives a pumped voltage 4Vdd from the second charge pumping unit 52 and alternately performs the pumping operation and the precharge operation through the first pumping operation and the second pumping operation.

The precharge voltage output unit 50 includes a pair of NMOS transistors NM51, NM52 coupled in parallel with each other, and another pair of NMOS transistors NM53, NM54 coupled in parallel with each other. The two pairs of NMOS transistor (NM51, NM52) (NM53, NM54) are preferably symmetrical to each other.

The first pumping stage in the first charge pumping unit 51 includes a transmission NMOS transistor TX51 having its drain coupled to each source of the NMOS transistor pair NM51, NM52, and a condenser X51 coupled between the drain of the transmission NMOS transistor TX51 and an input terminal of the clock signal CLKX. An NMOS transistor NM55 is coupled between the drain and the gate of the transmission NMOS transistor TX51 and a condenser X54 is coupled between the NMOS transistor NM55 and an input terminal of the clock signal 2CLKX.

The second pumping stage in the first charge pumping unit 51 includes a transmission NMOS transistor TY51 having its drain coupled to each source of the NMOS transistor pair NM53, NM54; a condenser Y51 connected between the drain of the transmission NMOS transistor TY51 and an input terminal of the clock signal CLKY. An NMOS transistor NM56 is coupled between the drain and the gate of the transmission NMOS transistor TY51 and a condenser Y54 is coupled between the NMOS transistor NM56 and an input terminal of the clock signal 2CLKY.

That is, the first pumping stage and the second pumping stage of the first charge pumping unit 51 are preferably symmetrical to each other. The gate of the NMOS transistor NM55 is coupled to the drain of the NMOS transistor NM56. The gate of the NMOS transistor NM56 is coupled to the drain of the NMOS transistor NM55.

The second and third charge pumping units 52, 53 are preferably identical to the first charge pumping unit 51 in composition. However, the clock signals CLKY, 2CLKY are applied to the first pumping stage and the clock signals CLKX, 2CLKX are applied to the second pumping stage in the second charge pumping unit 52.

Figure 8B:
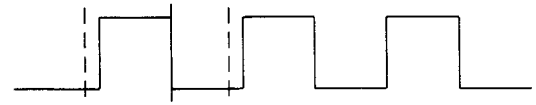

FIG. 7 shows a preferred embodiment of a clock signal generator for a Vdd level signal. A clock signal CLKY' outputted from an inverter I8, as shown in FIG. 8B, is a signal inverted and delayed from a clock signal PHASEY shown in FIG. 8D. A clock signal CLKX' outputted from an inverter I4 is a signal inverted and delayed from a signal PHASEX shown in FIG. 8A. As a result, when the clock signals PHASEX, CLKY' are NORed and delayed, a clock signal CLKX that has a low level interval longer than that a high level interval is generated as shown in FIG. 8C. When the clock signals PHASEY, CLKX' are NORed and delayed, a clock signal CLKY that has a low level interval longer than that a high level interval is generated, as shown in FIG. 8E.

FIG. 9 shows a preferred embodiment of a clock signal generator for a 2Vdd level signal. In an initial state of the 2Vdd level clock signal generator as shown in FIG. 9, the clock signal CLKX is turned to a low level and the signal CLKY is turned to a high level as shown in FIGS. 10C and 10D. Thus, the Vdd precharged in a condenser type NMOS transistor Y91 by a precharge voltage output unit 91 is pumped to a voltage value of 2Vdd, and an NMOS transistor NM92 is turned on. Accordingly, the condenser type NMOS transistor X91 is precharged to Vdd.

At this time, an NMOS transistor NM95 is turned on by the high level clock signal PHASEX as shown in FIG. 10A, and the clock signal 2CLKX outputted from the first pumping unit 93X is turned to a low level signal as shown in FIG. 10E. When the clock signal CLKX is turned to a high level and the clock signal CLKY is turned to a low level, the voltage Vdd precharged in the condenser type NMOS transistor X91 is pumped to a voltage value of 2Vdd. Thus, the NMOS transistor NM93 is turned on and the condenser type NMOS transistor Y91 is precharged to a voltage Vdd.

As a result, the NMOS transistor NM95 is turned off by the low level clock signal PHASEX, and the clock signal 2CLKX is turned to a voltage of 2Vdd as shown in FIG. 10E. Similarly, the clock signal 2CLKY outputted from the second pumping unit 93Y is turned to a voltage value of 2Vdd as shown in FIG. 10F. The thusly generated clock signals (CLKX, 2CLKX), (CLKY, 2CLKY) are preferably applied to the preferred embodiment of the charge pump circuit shown in FIG. 5.

Pumping operations of the first, second and third pumping units 51, 52, 53 in the preferred embodiment of the charge pump circuit according to the present invention will now be described. When the low level clock signals CLKX, 2CLKX as shown in FIGS. 6A and 6C and the clock signals CLKY, 2CLKY as shown in FIGS. 6B and 6D are received via the respective clock terminals, the voltage of Vdd precharged in the condenser Y51 of the first charge pumping unit 51 is pumped to a voltage value of 2Vdd, and the voltage value of 2Vdd precharged in the condenser Y54 is pumped to a voltage value of 3Vdd. Thus, the gate voltage of the transmission NMOS transistor TY51 becomes higher than the drain voltage thereof.

As a result, the transmission NMOS transistor TY51 is turned on. Accordingly, the voltage value of 2Vdd pumped in the condenser Y51 is precharged in the condenser Y52 of the second charge pumping unit 52 through the turned-on transmission NMOS transistor TY51 without a voltage drop. Meanwhile, the voltage value of 2Vdd pumped in the condenser Y51 is again applied to the respective gates and turns on the NMOS transistors NM52, NM55. Thus, a supply voltage Vdd becomes precharged in the respective condensers X51, X54 without a voltage drop.

In the second charge pumping unit 52, the clock signals CLKX, 2CLKX are respectively transmitted to a low level, and the clock signals CLKY, 2CLKY are respectively transmitted to a high level. Thus, the voltage value of 3Vdd pumped in the condenser X52 is precharged in the condenser X53 of the third charge pumping unit 53 through the transmission NMOS transistor TX52. In the third charge pumping unit 53, the voltage value of 3Vdd precharged in the condenser X53 is precharged in the condenser X56 through the turned-on NMOS transistor NM59. At the same time, the voltage value of 4Vdd pumped in the condenser Y53 becomes outputted through the turned-on transmission NMOS transistor TY53 to the output terminal Vout with a voltage drop.

Also, in the third charge pumping unit 53, when the clock signals CLKX, 2CLKX are respectively transmitted to a high level and the clock signals CLKY, 2CLKY are respectively transmitted to a low level, the voltage value of 4Vdd pumped in the condenser X53 is outputted to the output terminal Vout through the turned-on transmission NMOS transistor TX53 without a voltage descent. The NMOS transistor NM60 is turned on by the voltage value of 4Vdd pumped in the condenser X53, whereby the voltage value of 3Vdd precharged in the condenser Y53 is precharged in the condenser Y56 through the turned-on MOS transistor NM60.

That is, when the clock signals CLKX, 2CLKX are respectively transmitted to a high level and the clock signals CLKY, 2CLKY are respectively transmitted to a low level, the first pumping stage in the first charge pumping unit 51, the second pumping state in the second charge pumping unit 52 and the first pumping stage in the third charge pumping unit 53 respectively carry out a pumping operation to output the voltage value of 4Vdd through the output terminal Vout. In addition, the second pumping stage in the first charge pumping unit 51, the first pumping stage in the second charge pumping unit 52, and the second pumping stage in the third charge pumping unit 53 are respectively precharged.

When the clock signals CLKX, 2CLKX are respectively transmitted to a low level, and the dock signals CLKY, 2CLKY are respectively transmitted to a high level, the second pumping stage in the first charge pumping unit 51, the first pumping state in the second charge pumping unit 52 and the second pumping stage in the third charge pumping unit 53 respectively carry out a pumping operation to output the voltage value of 4Vdd through the output terminal Vout. In addition, the first pumping stage in the first charge pumping unit 51, the second pumping stage in the second charge pumping unit 52 and the first pumping stage in the third charge pumping unit 53 are respectively precharged.

As described above, the preferred embodiments according to the present invention have various advantages. The preferred embodiments of the charge pump circuit according to the present invention do not generate a voltage drop that may occur because of the threshold voltage of the NMOS transistors and enables the pumped voltage to be outputted to the next stage. In particular, the gate voltage level of the transmission MOS transistor is supplied higher than the drain voltage to prevent the voltage drop caused by the threshold voltage. Further, the preferred embodiment of the charge pump circuit according to the present invention has first and second pumping stages in the pumping unit that alternately carry out a pumping operation. In addition, the first and second pumping stages alternately carry a precharging operation. The simple circuit composition of the present invention applies to the generation of additional level clock signals (e.g., a 2Vdd level clock signal) so that a preferred embodiment of a charge pump circuit has a decreased number of pumping steps. Still further, by adding a prescribed plurality of pumping units, the preferred embodiments of the present invention can obtain a desired voltage level. Thus, the preferred embodiments of the charge pump circuit has a simple circuit composition and an improved the pumping efficiency.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A charge pump circuit, comprising:
   a clock signal generator that generates first and second clock signals respectively having a first amplitude, and third and fourth signals having a second amplitude, wherein the first and second amplitudes are different;
   a precharge voltage output unit that outputs precharge voltage; and
   a charge pumping unit that alternately performs a pumping operation and a precharging operation with regard to the precharge voltage received from the precharge voltage output unit respectively using a first pumping stage and a second pumping stage based on the first to fourth clock signals.

2. The charge pump circuit according to claim 1, wherein the clock signal generator comprises:
   a first logic-gate that receives a fifth clock signal through a first input terminal;
   a first plurality of inverters coupled in series to invert an output signal from the first logic-gate;
   a second logic-gate that receives a sixth clock signal through a first input terminal, and an output signal from the last inverter of the first plurality of inverters through a second input terminal; and
   a second plurality of inverters coupled in series to invert an output signal from the second logic-gate, wherein an output signal from the last inverter of the second plurality of inverters is applied to a second input terminal of the first logic-gate, wherein output signals from the first and second plurality of inverters respectively become the first clock signal and the second clock signal.

3. The charge pump circuit according to claim 1, wherein the clock signal generator comprises:
   a second precharge voltage output unit that outputs the precharge voltage;
   a first pumping unit that alternately performs a precharging operation and a pumping operation in accordance with respective levels of the first clock signal and a fifth clock signal to generate the third clock signal; and
   a second pumping unit that alternately performs a precharging operation and a pumping operation in accordance with respective levels of the second clock signal and a sixth clock signal to generate the fourth clock signal.

4. The charge pump circuit according to claim 1, wherein the precharge voltage output unit comprises:
   a first transistor having a control electrode and a second electrode coupled to each other;
   a second transistor coupled in parallel to the first transistor;
   a third transistor having a control electrode and a second electrode coupled to each other; and
   a fourth transistor coupled in parallel to the third transistor, wherein the second electrode of the first through fourth transistors are coupled to a first reference voltage.

5. The charge pump circuit according to claim 4, wherein the first pumping stage in the charge pumping unit comprises:
   a first transmission transistor having a second electrode coupled to respective sources of the first and second transistors;
   a first condenser coupled between the second electrode of the first transmission transistor and an input terminal of the first clock signal;
   a fifth transistor coupled between the second electrode and the control electrode of the first transmission transistor; and
   a second condenser coupled between the fifth transistor and an input terminal of the third clock signal.

6. The charge pump circuit according to claim 1, wherein the second pumping stage in the charge pumping unit comprises:
   a transmission transistor having a second electrode coupled to the precharge voltage output unit to receive the first reference voltage;
   a first condenser coupled between the second electrode of the transmission transistor and an input terminal of the second clock signal;
   a first transistor coupled between the second electrode and the control electrode of the transmission transistor; and
   a second condenser coupled between the first transistor and an input terminal of the fourth clock signal.

7. The charge pump circuit according to claim 6, wherein the control electrode of the first transistor is coupled to a connection point between of the precharge voltage output unit and the first pumping stage.

8. The charge pump circuit according to claim 1, wherein a second charge pumping unit is coupled to the charge pumping unit.

9. The charge pump circuit according to claim 8, wherein in alternate cycles the first and second clock signals are applied to the first pumping stage of the charge pumping unit and the second pumping stage of the second charge pumping unit and the third and fourth clock signals are applied to the second pumping stage of the charge pumping unit and the first pumping stage of the second charge pumping unit.

10. The charge pump circuit of claim 1, further comprising a plurality of charge pumping units coupled in series to the charge pumping unit, wherein the charge pumping units are grouped into odd and even numbered groups of charge pumping units.

11. The charge pump circuit according to claim 10, wherein in alternate cycles the first and second clock signals are respectively applied to the first pumping stage of the odd numbered group of charge pumping units and the second pumping stage of the even numbered group of charge pumping units and the third and fourth clock signals are applied to the second pumping stage of the odd numbered group of charge pumping units and the first pumping stage of the even numbered group of charge pumping units.

12. The charge pump circuit according to claim 1, wherein one of the first and the second stage of the charge pumping unit respectively output a desired voltage level each cycle.

13. The charge pump circuit according to claim 1, wherein the first and second pumping stages are symmetrical to each other, and wherein the first amplitude is substantially equal to the precharge voltage and the second amplitude is substantially equal to twice the first amplitude.

14. A charge pump unit, comprising:
a plurality of charge pumping devices receiving first through fourth dock signals and an incoming voltage, wherein each charge pumping device comprises:
a first pumping stage; and
a second pumping stage, wherein the first and second pumping stages alternately perform a pumping operation and a precharging operation with regard to the incoming voltage based on the first to fourth clock signals, and wherein one of of the plurality of charge pumping devices outputs a desired voltage level each cycle.

15. The charge pump circuit according to claim 14, wherein one of the first and the second stage of a last charge pumping device of the plurality of charge pumping devices respectively output the desired voltage level.

16. The charge pump circuit according to claim 14, further comprising:
a clock signal generator that generates the first and second clock signals respectively having a first level, and the third and fourth signals having a second level, wherein phases of the third and fourth signals are substantially identical to the first and second clock signals; and
a precharge voltage output unit that outputs incoming voltage to the first charge pumping device of the plurality of charge pumping devices.

17. The charge pump circuit according to claim 14, wherein the first pumping stage in each of the plurality of charge pumping devices comprises:
a first transmission transistor having a second electrode coupled to a connection node that receives the incoming voltage;
a first condenser coupled between the second electrode of the first transmission transistor and an input terminal of the first clock signal;
a first transistor coupled between the second electrode and the control electrode of the first transmission transistor; and
a second condenser coupled between the first transistor and an input terminal of the third clock signal.

18. The charge pump circuit according to claim 14, wherein the second pumping stage in each of the plurality of charge pumping devices comprises:
a first transmission transistor having a second electrode coupled to a connection node that receives the incoming voltage;
a first condenser coupled between the second electrode of the first transmission transistor and an input terminal of the second clock signal;
a first transistor coupled between the second electrode and the control electrode of the first transmission transistor; and a second condenser coupled between the first transistor and an input terminal of the fourth clock signal, wherein the control electrode of the first transistor is coupled to the corresponding first pumping stage.

19. A clock signal generator, comprising:
a precharge voltage output unit that outputs a precharge voltage;
a first pumping unit that alternately performs a precharging operation and a pumping operation in accordance with a first clock signal and a fifth clock signal to generate a third clock signal; and
a second pumping unit that alternately performs a precharging operation and a pumping operation in accordance with a second clock signal and a sixth clock signal to generate a fourth clock signal, wherein the first and second clock signals have a first amplitude, wherein the third and fourth clock signals have a second amplitude, and wherein the second amplitude is greater than the first amplitude.

20. The clock signal generator according to claim 19, wherein the precharge voltage output unit comprises:
a first transistor having a control electrode and a second electrode coupled to each other;
a second transistor coupled in parallel to the first transistor;
a third transistor having a control electrode and a second electrode coupled to each other; and
a fourth transistor coupled in parallel to the third transistor, wherein the second electrode of the first through fourth transistors are coupled to a first reference voltage.

21. The charge pump circuit of claim 1, wherein the second amplitude is a selectively boosted amplitude.

22. The charge pump circuit of claim 1, wherein phases of the third and fourth signals are substantially identical to the first and second signals.

23. The charge pump unit of claim 14, wherein the first pumping stages are cascaded.

24. The charge pump unit of claim 23, wherein the adjacent ones of the second pumping stages are cascaded to output the desired voltage level.

25. The charge pump circuit of claim 24, wherein the first pumping stages are sequentially cascaded to output the desired voltage on alternate cycles from the second pumping stages.

26. A charge pump circuit, comprising:
a clock signal generator that generates first and second clock signals respectively having a first amplitude, and third and fourth signals having a second amplitude, wherein the first and second amplitudes are different, wherein the clock signal generator comprises,
a first logic-gate that receives a fifth clock signal through a first input terminal,
a first plurality of inverters coupled in series to invert an output signal from the first logic-gate,
a second logic-gate that receives a sixth clock signal through a first input terminal, and an output signal from the last inverter of the first plurality of inverters through a second input terminal, and
a second plurality of inverters coupled in series to invert an output signal from the second logic-gate, wherein an output signal from the last inverter of the second plurality of inverters is applied to a second input terminal of the first logic-gate, wherein output signals from the first and second plurality of inverters respectively become the first clock signal and the second clock signal;

a precharge voltage output unit that outputs precharge voltage; and a charge pumping unit that alternately performs a pumping operation and a precharging operation with regard to the precharge voltage received from the precharge voltage output unit respectively using a first pumping stage and a second pumping stage based on the first to fourth clock signals.

* * * * *